United States Patent
Poolavari et al.

(10) Patent No.: US 11,157,964 B2
(45) Date of Patent: Oct. 26, 2021

(54) TEMPORAL-BASED RECOMMENDATIONS FOR PERSONALIZED USER CONTEXTS AND VIEWING PREFERENCES

(71) Applicant: Samsung Electronics Company, Ltd., Suwon si (KR)

(72) Inventors: Ganapriya Poolavari, Saratoga, CA (US); Ke Jin, San Francisco, CA (US); Sharath Polepalli, Santa Clara, CA (US); Vinod S. Talati, Campbell, CA (US)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 18 days.

(21) Appl. No.: 16/737,764

(22) Filed: Jan. 8, 2020

(65) Prior Publication Data

US 2020/0219139 A1 Jul. 9, 2020

Related U.S. Application Data

(60) Provisional application No. 62/790,364, filed on Jan. 9, 2019.

(51) Int. Cl.
*G06Q 30/00* (2012.01)
*G06Q 30/02* (2012.01)
(Continued)

(52) U.S. Cl.
CPC ....... *G06Q 30/0269* (2013.01); *G06F 16/735* (2019.01); *G06N 5/04* (2013.01); *H04N 21/2668* (2013.01); *H04N 21/458* (2013.01)

(58) Field of Classification Search
CPC .... G06Q 30/0269; G06F 16/735; G06N 5/04; H04N 21/2668; H04N 21/458
See application file for complete search history.

(56) References Cited

U.S. PATENT DOCUMENTS 7,017,172 B2 3/2006 Schaffer
8,645,986 B2 2/2014 Matsuyama
(Continued)

FOREIGN PATENT DOCUMENTS

EP 2 073 130 A1 6/2009
KR 10-2014-0077761 A 6/2014
(Continued)

OTHER PUBLICATIONS

International Patent Application No. PCT/KR2020/000428 PCT International Search Report, dated Apr. 22, 2020, 9 pages.

*Primary Examiner* — Scott C Anderson
(74) *Attorney, Agent, or Firm* — Baker Botts L.L.P.

(57) ABSTRACT

A method includes receiving temporal-based user profile data including a first set of user profile data and a second set of user profile data. The method further includes determining an aggregated profile covariance (APC) and an aggregated profile variance (APV), and then deriving a regression coefficient based on the APC and the APV. In response to receiving an observation of desirable media content for one or more particular timeslots, the method further includes determining an updated APC based on a covariance of the first set of user profile data and the observation of desirable media content, determining an updated APV based on a variance of the first set of user profile data, and generating a prediction of desirable media content based on the updated APC, the updated APV, and the regression coefficient. The prediction of desirable media content corresponds to the one or more particular timeslots.

20 Claims, 9 Drawing Sheets

(51) Int. Cl.
*G06F 16/735* (2019.01)
*H04N 21/458* (2011.01)
*H04N 21/2668* (2011.01)
*G06N 5/04* (2006.01)

(56) References Cited

U.S. PATENT DOCUMENTS

| | | |
|---|---|---|
| 8,799,936 B2 | 8/2014 | Choi |
| 2013/0063561 A1* | 3/2013 | Stephan ............... H04N 13/302 |
| | | 348/46 |
| 2016/0112740 A1* | 4/2016 | Francisco ........ H04N 21/44222 |
| | | 725/12 |
| 2017/0188102 A1 | 6/2017 | Zhang |
| 2018/0007432 A1 | 1/2018 | Pontual |
| 2019/0266499 A1* | 8/2019 | Maluf .................... G06N 7/005 |

FOREIGN PATENT DOCUMENTS

| KR | 10-1644956 B1 | 8/2016 |
|---|---|---|
| WO | WO 2017/107453 A1 | 6/2017 |

* cited by examiner

TEMPORAL-BASED RECOMMENDATIONS FOR PERSONALIZED USER CONTEXTS AND VIEWING PREFERENCES

CROSS-REFERENCE TO RELATED APPLICATIONS

This application claims the benefit of U.S. Provisional Patent Application No. 62/790,364, filed on Jan. 9, 2019, the entire contents of which are incorporated herein by reference.

TECHNICAL FIELD

This disclosure relates generally to temporal-based, personalized recommendation systems and methods.

BACKGROUND

Recommendation systems typically include applications that facilitate users in locating items of interest for consumption, often in a quasi-personalized manner. A certain type of recommendation system may include a television (TV) recommendation system, which may be utilized to provide recommendations, for example, for certain movies, TV series, news programs, sporting telecasts, and so forth that a particular user(s) may be interested in viewing. Additionally, with the plethora of programming genres, programming channels, video-sharing platform publisher channels, and other features increasingly available to users, deep learning techniques may be applied in recommendation systems to improve user viewing recommendations. For example, one such deep-learning-based recommendation system may include a system that utilizes long-short-term memory (LSTM) recurrent neural networks (RNNs). Particularly, recommendation systems utilizing LSTM/RNNs may be suitable for modeling, for example, sequential and structured TV programming data. However, because the actual TV programming viewing habits of users may, in many instances, include non-sequential and/or unstructured data (e.g., due to users viewing preferences varying or evolving over time), recommendation systems relying on such LSTM/RNNs may often provide recommendations that are unpersonalized and undesirable to the user.

DESCRIPTION OF EXAMPLE EMBODIMENTS

Figure 1:
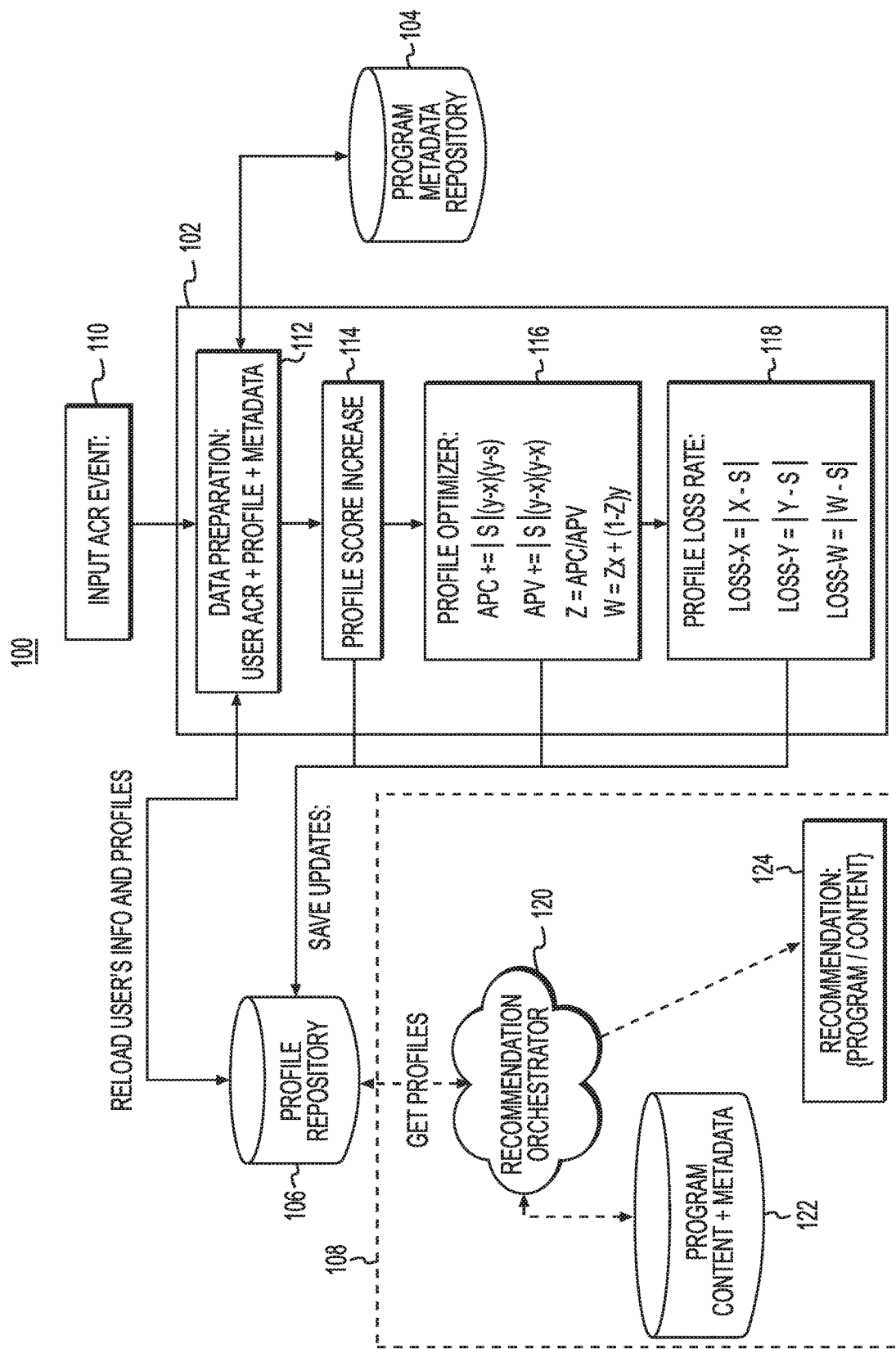
FIG. 1 illustrates an example temporal-based recommendation system.

Embodiments described herein relate to a temporal-based recommendation system for generating a prediction of desirable media content (e.g., recommendations for user viewing of live or near-live media content) based on personalized user contexts and personalized user viewing preferences. For example, the temporal-based recommendation system may generate the prediction of desirable media content based on actually observed particular user viewing preferences, for example, for a TV program within a particular category group g, on or about a particular day d, and at or about a particular hour h of the present week or forthcoming week(s). In other words, the present embodiments may provide a prediction of the particular user's likely viewing behavior by iteratively and optimally balancing, for example, the particular user's specific time-based viewing history and at least some of the particular user's nontemporal-based viewing history. In this way, the presently disclosed embodiments may provide recommendations that are personalized to the particular user at the particular day-hour timeslot. Additionally, system computational load and storage costs may also be reduced because the presently disclosed techniques do not require reanalyzing a user's entire viewing history log when updating the recommendation system to include new user-specific information. Instead, the present recommendation system updates a running metric that captures the user's previous behavior and is updated to include new information about the user. Moreover, the system does not need to store or access all of a user's time-specific user profile data of the particular user and the actually observed desirable media content data of the particular user (on which the prediction of desirable media content relies) in order to account for that data in a recommendation. Instead, the system can store and access only some of the data (e.g., a few weeks amount of data), which conserves computational resources and further increases the privacy and security of user data.

While the present embodiments may be discussed below primarily with respect to TV recommendation systems, it should be appreciated that the present techniques may be applied to any of various recommendation systems that may facilitate users in locating particular items of interest (e.g., movies, TV series, documentaries, news programs, sporting telecasts, gameshows, vlogs, video clips, and so forth in which a particular user may be interested in viewing; certain articles of clothing, shoes, fashion accessories, or other e-commerce items the particular user may be interested in purchasing; certain podcasts, audiobooks, or radio shows to which the particular user may be interested in listening; certain books, e-books, or e-articles the particular user may be interested in reading; certain restaurants, bars, concerts, hotels, groceries, or boutiques in which the particular user may be interested in patronizing; certain social media users in which the particular user may be interested in "friending", or certain social media influencers or content creators in which the particular user may be interested in "following"; certain video-sharing platform publisher channels to which the particular user may be interested in subscribing; certain mobile applications ("apps") the particular user may be interested in downloading; and so forth) at a particular instance in time.

The present embodiments include providing a temporal-based recommendation system for generating a prediction of desirable media content (e.g., recommendations for user viewing of live or near-live media content) based on personalized user contexts and personalized user viewing preferences for a particular user at a particular timeslot. In certain embodiments, the temporal-based recommendation system may receive temporal-based user profile data associated with a client device suitable to display or play back media content. For example, in some embodiments, the temporal-based user profile data may include a time specific user profile (e.g., $X_{d,h}(g)_{week}$) and the total time-aggregated (e.g., all-time) user profile (e.g., $Y(g)$) in a day-hour context and for a particular programming category group g. The client device may include, for example, a TV or other multimedia electronic device (e.g., a desktop computer, a laptop computer, a tablet computer, a mobile phone, an appliance, and so forth) on which one or more users may view media content (e.g., live or near-live media content).

In some embodiments, the temporal-based recommendation system may then determine an aggregated profile covariance (APC) and an aggregated profile variance (APV) based on the first set of user profile data. Specifically, in some embodiments, the APC and the APV may be utilized by the temporal-based recommendation system to derive a regression coefficient $Z_{d,h}$ (e.g., weight factor), which may be iteratively optimized and retrained over time (e.g., over weeks) specific to the particular user and specific to a particular timeslot (e.g., day d-hour h contextual timeslot). In certain embodiments, in response to receiving from the client device an observation of desirable media content (e.g., $S_{d,h}(g)_{week}$) for one or more particular timeslots of a number of timeslots (e.g., day-hour contextual timeslots corresponding to 168 hours per weekly time period), the temporal-based recommendation system may determine an updated $APC_{d,h,w}$ based on a covariance of the time specific user profile (e.g., $X_{d,h}(g)_{week}$) and the observation of desirable media content (e.g., $S_{d,h}(g)_{week}$) for the one or more particular timeslots. The temporal-based recommendation system may also determine an updated $APV_{d,h,w}$ based on a variance of the time specific user profile (e.g., $X_{d,h}(g)_{week}$). Specifically, in some embodiments, the updated $APC_{d,h,w}$ and the updated $APV_{d,h,w}$ may each correspond to an additive arithmetic function that may be stored together with the time specific (e.g., day-hour) user profile $X_{d,h}(g)_{week}$.

In certain embodiments, the temporal-based recommendation system may then generate a prediction of desirable media content $w_{d,h}(g)$ corresponding to the one or more particular timeslots based on the updated $APC_{d,h,w}$, the updated $APV_{d,h,w}$, and the regression coefficient $Z_{d,h}$. For example, the prediction of desirable media content $w_{d,h}(g)$ may be generated to predict the probability that a particular user is likely to view a specific media content (e.g., TV program) within the particular category group g, on or about the particular day d, and at or about the particular hour h of the present week or the forthcoming week(s). The prediction of desirable media content $w_{d,h}(g)$ may be then iteratively optimized and retrained, such that an increasingly accurate prediction of desirable media content $w_{d,h}(g)$ may be generated with each subsequent iteration (e.g., for the present week and the forthcoming week(s)). Particularly, as will be appreciated in further detail below, any subsequent $APC_{d,h,w+1}$ and subsequent $APV_{d,h,w+1}$ for the forthcoming week(s) may be ascertained by merely summing the covariance of the time specific user profile $X_{d,h}(g)_{week-1}$ and the observation of desirable media content $S_{d,h}(g)_{week-1}$ for the previous week and the variance of the time specific user profile $X_{d,h}(g)_{week-1}$ for the previous week without rederiving the regression coefficient $Z_{d,h}$.

Thus, the recommendation system disclosed herein provides significant technical improvements. For example, the recommendation system is personalized for specific users and specific user/device combinations at or about a specific timeslot. In other words, regression coefficient $Z_{d,h}$ is not merely a weighted factor or an averaged summation across all user data, but instead is a user-specific and timeslot-specific determination. In addition, while such personalization may be possible using, for example, a deep-learning network, such approaches include recalculating the regression coefficient $Z_{d,h}$ from the entire set of user data to be considered each time a change to the recommendation system is introduced, such as when new user data is incorporated into the system. In contrast, present embodiments update the regression coefficient $Z_{d,h}$ in an iterative fashion—that is, $Z_{d,h}$ at a given point in time represents the effect of past user behavior and can be updated, using the methods and systems described herein, to include the effect of new user data without re-computing $Z_{d,h}$ on the entire dataset of past user behaviors to be considered by the recommendation system.

For example, the recommendation system may iteratively and optimally weigh or balance the regression coefficient $Z_{d,h}$, such that the regression coefficient $Z_{d,h}$ may be fine-grained to a specific user and to a specific timeslot (e.g., day-hour timeslot). Thus, the present embodiments may provide a prediction of the particular user's likely viewing behavior by iteratively and optimally balancing, for example, the particular user's specific time-based viewing history and at least some of the particular user's nontemporal-based viewing history. This significantly decreases the amount of computational resources needed to provide personalized recommendations, both due to processing time and power in calculating the regression coefficient $Z_{d,h}$ and in storage resources needed to maintain voluminous historical data. In addition, the ability of the recommendation system disclosed herein to iteratively update the regression coefficient $Z_{d,h}$ in a manner that reflects user behavior without having to store past user data long-term further increases user privacy and security.

An example temporal-based recommendation system 100 is illustrated by FIG. 1. As depicted by FIG. 1, the temporal-based recommendation system 100 may include an analytics system 102, one or more databases 104, 106, and a TV programming and recommendations subnetwork 108. In certain embodiments, the analytics system 102 may include a cloud-based cluster computing architecture or other similar computing architecture that may receive one or more user article content representation (ACR) observed user viewing inputs 110 and provide TV programming data and recommendations data to one or more client devices (e.g., a TV, a standalone monitor, a desktop computer, a laptop computer, a tablet computer, a mobile phone, a wearable electronic device, a voice-controlled personal assistant device, an automotive display, a gaming system, an appliance, or other similar multimedia electronic device) suitable for displaying media content and/or playing back media content. Additionally, the analytics system 102 may be utilized to process and manage various analytics and/or data intelligence such as TV programming analytics, web analytics, user profile data, user payment data, user privacy preferences, and so forth. For example, in one embodiment, the analytics system 102 may include a Platform as a Service (PaaS) architecture, a Software as a Service (SaaS) architecture, and an Infrastructure as a Service (IaaS), or other various cloud-based cluster computing architectures.

In certain embodiments, as further depicted by FIG. 1, the analytics system 102 may include a number of subsystems 112, 114, 116, and 118, which may each include, for example, a computing engine. For instance, during operation, the subsystem 112 may receive the ACR user observed viewing input 110, which may include, for example, specific media content (e.g., TV programs) recently viewed by a particular user. For example, the ACR observed user viewing input 110 may include an identification of the recently viewed media content (e.g., TV programs), metadata associated with the recently viewed media content (e.g., TV programs), the particular timeslot (e.g., day-hour) the recently viewed media content (e.g., TV programs) was viewed within, and the programming channel on which the media content (e.g., TV programs) was viewed.

In certain embodiments, the subsystem 112 may then interface with the database 104 to associate the recently viewed media content included in the ACR user viewing input 110 with TV programming data stored by the database 104. For example, the TV programming data stored by the database 104 may include, for example, user profile data, programming genre data, programing category data, programming clustering category group data, or other TV programming data or metadata that may be stored by the database 104. Specifically, the ACR observed user viewing input 110 may be received on each hour-of-day for an entire week, which may be expressed as a set of day-hour timeslots (e.g., 168 timeslots) represented by the observation of desirable media content $S_{d,h}(g)$ and/or the weekly observed desirable media content set $\{S_{d,h}(g)\}$. For example, in $S_{d,h}(g)_{week}$ and/or $\{S_{d,h}(g)\}$, d may correspond to the days of the week: 1 to 7, and h may correspond to the hour of the day: 0 to 23. Thus, the contextual day-hour timeslots may, in some embodiments, correspond to a product of the number of days d in a week (e.g., 7 days) and the number of hours h in a day (e.g., 24 hours) to produce 168 individual day-hour timeslots per weekly time period. In a similar manner, g may correspond to a TV programming category group of, for example, a set of TV programming category groups $\{g\}$.

In some embodiments, the set of category groups $\{g\}$ may be predefined to include, for example, any number of TV programming channels (e.g., local broadcast TV programming channels, basic cable TV programming channels, premium cable TV programming channels, video-sharing platform publisher channels, and so forth), or any number of programming genres (e.g., kids and family, drama, crime, romance, comedy, action, reality-TV, sports, soap-opera, animation, horror, politics, and so forth). In another embodiment, the set of category groups $\{g\}$ may be determined, for example, by performing a machine learning (ML) clustering of "similar user category groups" (e.g., clustered together based on user demographics, user geographical location, user political persuasion, user niche interests, and so forth) or "similar item category groups" (e.g., cluster together based on type of media content such as movies, TV series, documentaries, news programs, sporting telecasts, vlogs, video clips, and so forth).

In certain embodiments, as further depicted by FIG. 1, the subsystem 112 may provide an output to the subsystem 114. The subsystem 114 may then increase, for example, a scoring of the time specific user profile (e.g., $X_{d,h}(g)_{week}$) and the total time-aggregated user profile (e.g., $Y(g)$) for the particular user and at the particular timeslot. The subsystem 114 may then provide an output of the user profile data to the subsystem 116. As will be described in further detail with respect to FIGS. 5-8, the subsystem 116 may then calculate, based on the received user profile data and the ACR observed user viewing input 110, an APC and updated $APC_{d,h,w}$, an APV and updated $APV_{d,h,w}$, a regression coefficient (e.g., $Z_{d,h}$), and a prediction calculation of desirable media (e.g., $w_{d,h}(g)$) for the particular user and at the particular timeslot.

In certain embodiments, the subsystem 118 may then calculate a respective loss function with respect to, for example, the time-specific user profile (e.g., $X_{d,h}(g)_{week}$), the total time-aggregated user profile (e.g., $Y(g)$), and the prediction of desirable media content (e.g., $w_{d,h}(g)$). As further illustrated by FIG. 1, each of the subsystems 112, 114, 116, and 118 may each store the aforementioned calculated and updated data (e.g., time specific user profile data, total time-aggregated user profile data, APC and updated APC, APV and updated APV, regression coefficient, prediction of desirable media content, and loss function data) to the database 106. In certain embodiments, as further depicted by FIG. 1, a network-based recommendation orchestrator 120 may retrieve the aforementioned calculated and updated data from the database 106. The recommendation orchestrator 120 may then store the calculated and updated data together with the TV programming data in a TV programming database 122. In certain embodiments, based on the calculated and updated data (e.g., time specific user profile data, total time-aggregated user profile data, APC and updated APC, APV and updated APV, regression coefficient, prediction of desirable media content, and loss function data), the recommendation orchestrator 120 may provide TV programming data and recommendation data 124 to, for example, an end-user client device for user viewing.

Figure 2:
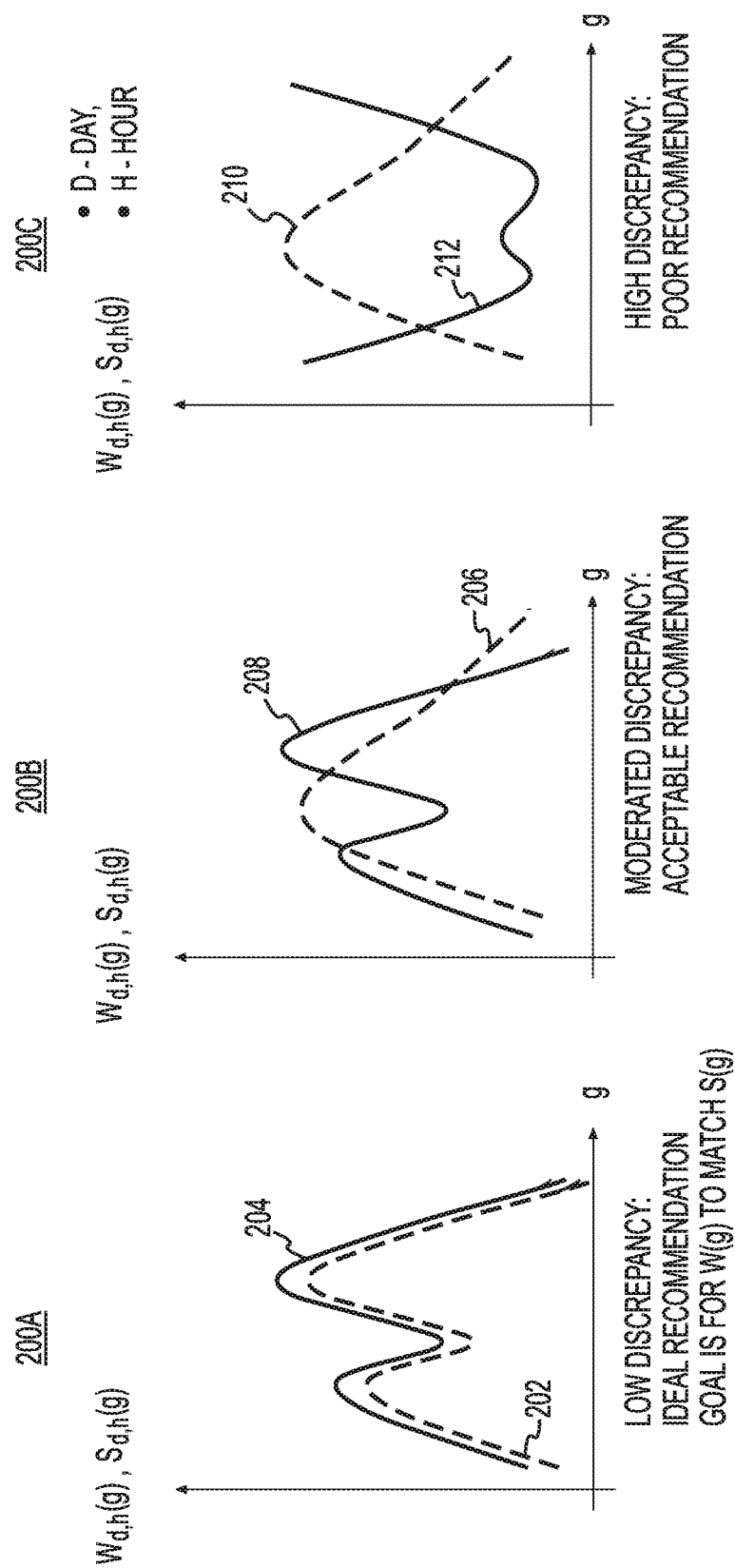
FIG. 2 illustrates an observed mapping function diagram and a prediction mapping function diagram.

FIG. 2 illustrates an observed mapping function diagram and a prediction mapping function diagram for each of a low deviation diagram 200A, a moderate deviation diagram 200B, and a high deviation diagram 200C. As illustrated by FIG. 2, the low deviation diagram 200A, the moderate deviation diagram 200B, and the high deviation diagram 200C may each include an observation of desirable media content $S_{d,h}(g)$ function plotted against a prediction of desirable media content $w_{d,h}(g)$ function, in accordance with the present embodiments. For example, the prediction of desirable media content $w_{d,h}(g)$ may correspond to a predicted probability or a set of probabilities, while observation of desirable media content $S_{d,h}(g)$ may correspond to an actually observed value or set of values (e.g., corresponding to media content that was actually viewed by the particular user and at a particular timeslot). In other words, in accordance with the present embodiments, the prediction of desirable media content $w_{d,h}(g)$ may be generated to predict the probability that a particular user is likely to view a specific media content (e.g., TV program) within the particular category group g, on or about the particular day d, and at or about the particular hour h of the present week or the forthcoming week(s). The prediction of desirable media content $w_{d,h}(g)$ may be then iteratively optimized and retrained, such that an increasingly accurate prediction of desirable media content $w_{d,h}(g)$ may be generated with each subsequent iteration (e.g., for the present week and the forthcoming week(s)). Thus, the present embodiments may provide a prediction of the particular user's likely viewing behavior by iteratively and optimally balancing, for example, the particular user's specific time-based viewing history and at least some of the particular user's nontemporal-based viewing history.

Thus, as depicted by the low deviation diagram 200A, the present techniques may engender, for example, a prediction of desirable media content $w_{d,h}(g)$ function 204 that closely tracks (e.g., including only negligible deviation between functions 202 and 204) the observation of desirable media content $S_{d,h}(g)$ function 202, such that the presently disclosed embodiments may provide only recommendations that are personalized and desirable, as indicated by the user's previous activity, to the particular user at the particular timeslot. In other embodiments, as depicted by the moderate deviation diagram 200B, the present techniques may initially provide a prediction of desirable media content $w_{d,h}(g)$ function 208 that moderately tracks (e.g., including moderate deviation between functions 206 and 208) the observation of desirable media content $S_{d,h}$ (g) function 206. As it follows, as the regression coefficient (e.g., $Z_{d,h}$), and, by extension, the prediction of desirable media content $w_{d,h}(g)$ is iteratively optimized and retrained over time, the prediction of desirable media content $w_{d,h}$ (g) function 204, which closely tracks (e.g., including only negligible deviation between functions 202 and 204) the observation of desirable media content $S_{d,h}(g)$ function 202 may be generated (as depicted by the low deviation diagram 200A).

However, without the presently disclosed embodiments of generating a prediction of desirable media content (e.g., recommendations for user viewing of live or near-live media content) based on personalized user contexts and personalized user viewing preferences for a particular user at a particular timeslot, a prediction of desirable media content $w_{d,h}(g)$ function 212 that does not track (e.g., including markedly high deviation between the functions 210 and 212) an observation of desirable media content $S_{d,h}(g)$ function 210 may otherwise be generated (as depicted by the high deviation diagram 200C). Thus, without the presently disclosed techniques, only recommendations that are unpersonalized and undesirable to the user may be generated.

Figure 3:
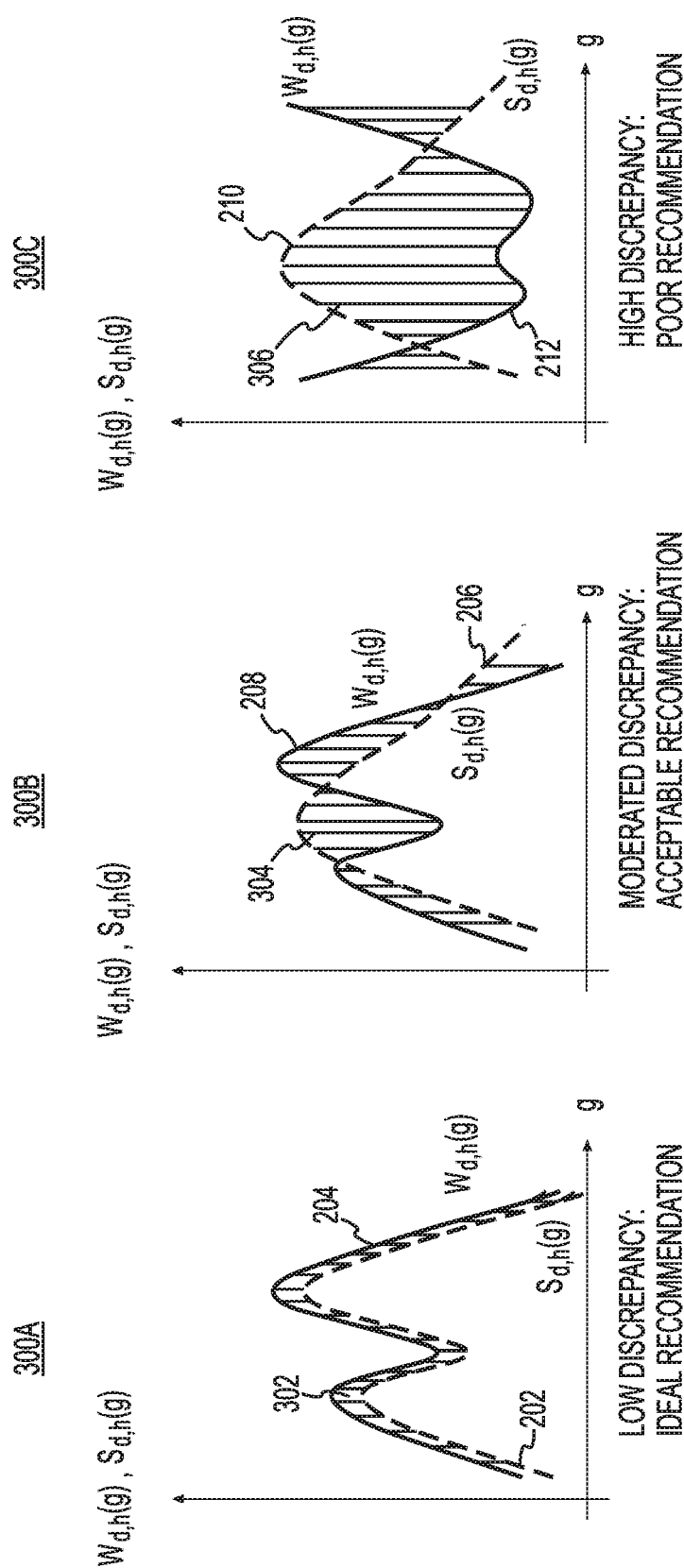
FIG. 3 illustrates an observed mapping function diagram and a prediction mapping function diagram.

FIG. 3 illustrates a low deviation diagram 300A, a moderate deviation diagram 300B, and a high deviation diagram 300C, as similarly discussed above with respect to FIG. 2. As depicted by FIG. 3, and as will be further appreciated with respect to FIG. 5, the low deviation diagram 200A may include a quantifiably low deviation 302 (e.g., low loss function), the moderate deviation diagram 200B may include a quantifiably moderate deviation 304 (e.g., moderate loss function), and the high deviation diagram 200C may include a quantifiably high deviation 306 (e.g., high loss function) in accordance with the present embodiments.

Figure 5:
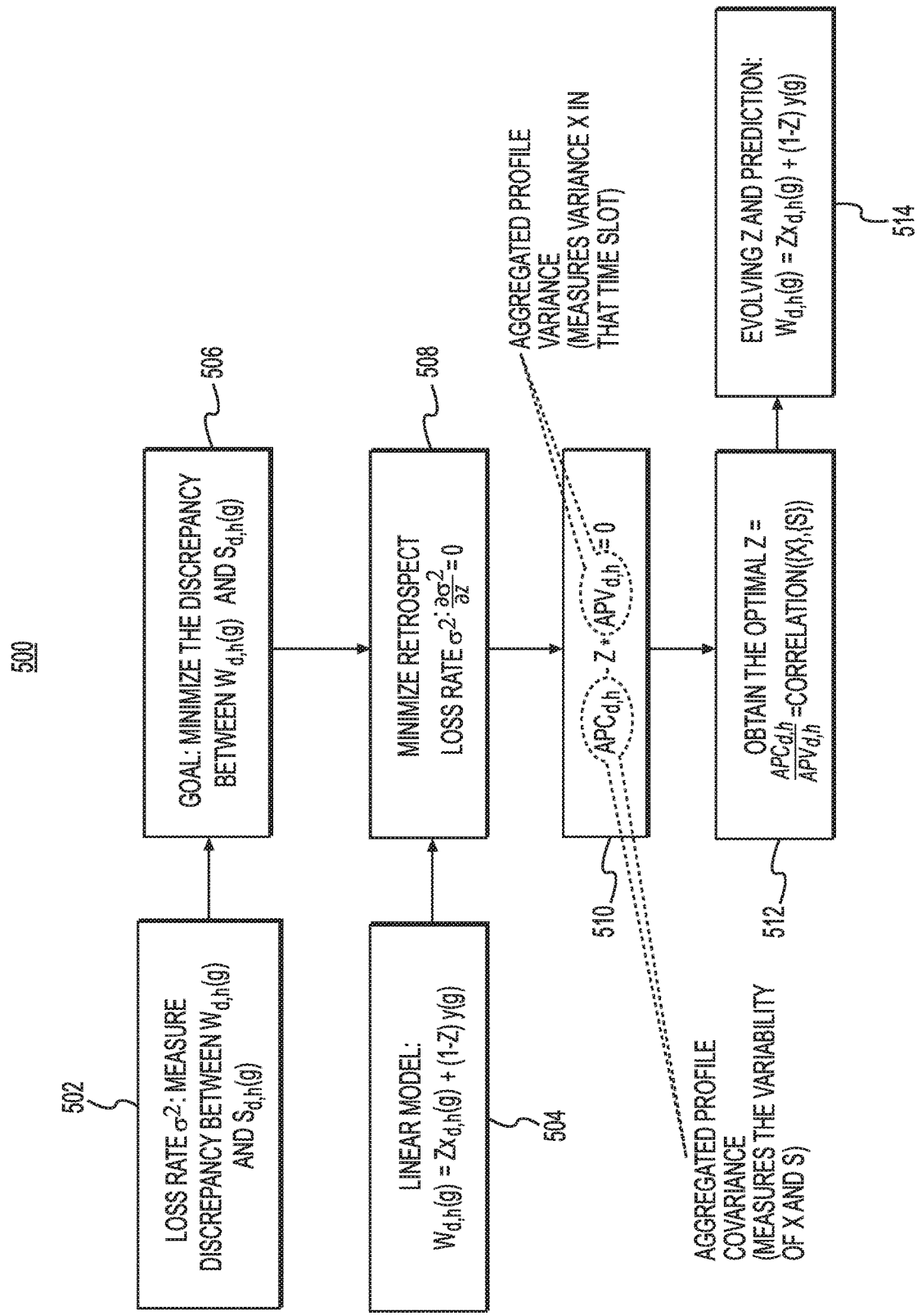
FIG. 5 illustrates a workflow diagram for deriving an optimal regression coefficient.
Figure 6:
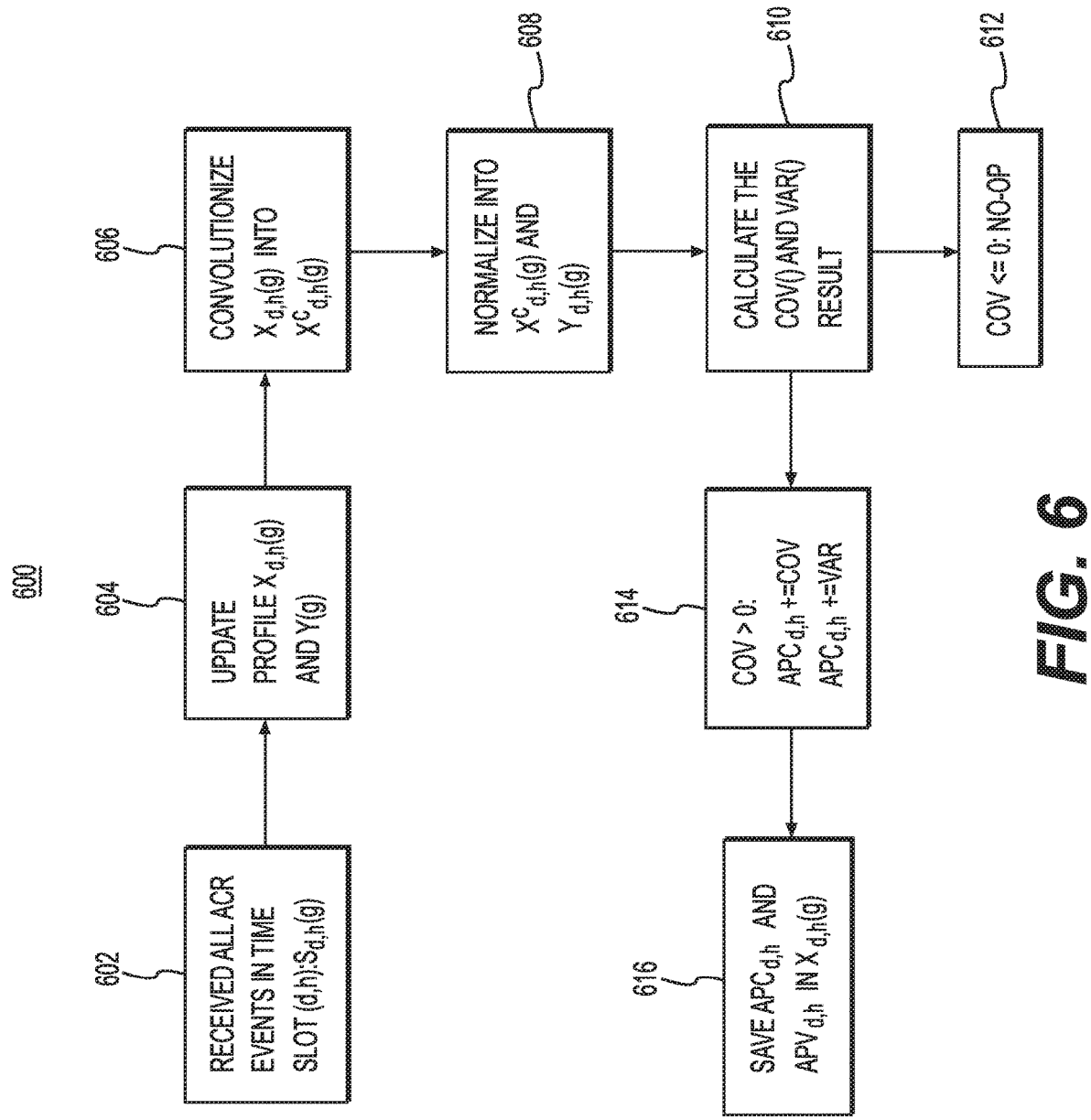
FIG. 6 illustrates a workflow diagram for calculating and storing an updated aggregated profile covariance (APC) and updated aggregated profile variance (APV).
Figure 7:
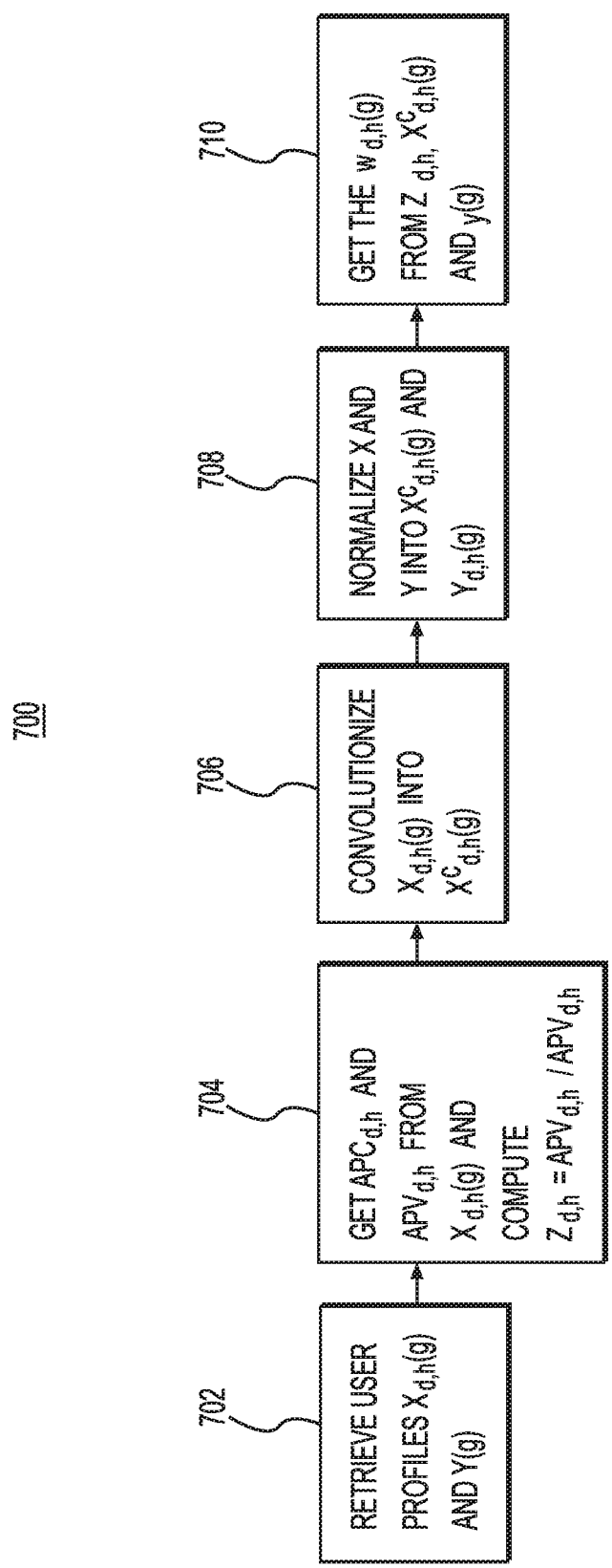
FIG. 7 illustrates a workflow diagram for generating a prediction of desirable media content.

As delineated herein, the presently disclosed embodiments include a temporal-based recommendation system that may be utilized to generate a prediction of desirable media content (e.g., recommendations for user viewing of live or near-live media content) based on personalized user contexts and personalized user viewing preferences for a particular user at a particular timeslot. Thus, henceforth, the present techniques may be discussed with respect to, for example, an illustrative example as provided by FIG. 4 and a number of workflow diagrams as provided by FIGS. 5-7 (e.g., which may be performed by the analytics system 102 of the temporal-based recommendation system 100 as discussed above with respect to FIG. 1). Specifically, as will be further appreciated below, FIG. 5 illustrates a workflow diagram for deriving an optimal regression coefficient $Z_{d,h}$, FIG. 6 illustrates a workflow diagram for calculating and storing an updated $APC_{d,h}$, and an updated $APV_{d,h}$, in response to receiving an incoming observation of desirable media content $S_{d,h}(g)$, and FIG. 7 illustrates a workflow diagram for generating a prediction of desirable media content $w_{d,h}(g)$. Further, while the workflow diagrams (e.g., workflow diagrams 500, 600, and 700) illustrated by FIGS. 5-7 may be discussed herein individually, it should be appreciated that the workflows may, in some embodiments, be performed in conjunction (e.g., in parallel) and/or iteratively (e.g., recursively) as ACR user observed viewing data is received over time.

Figure 4:
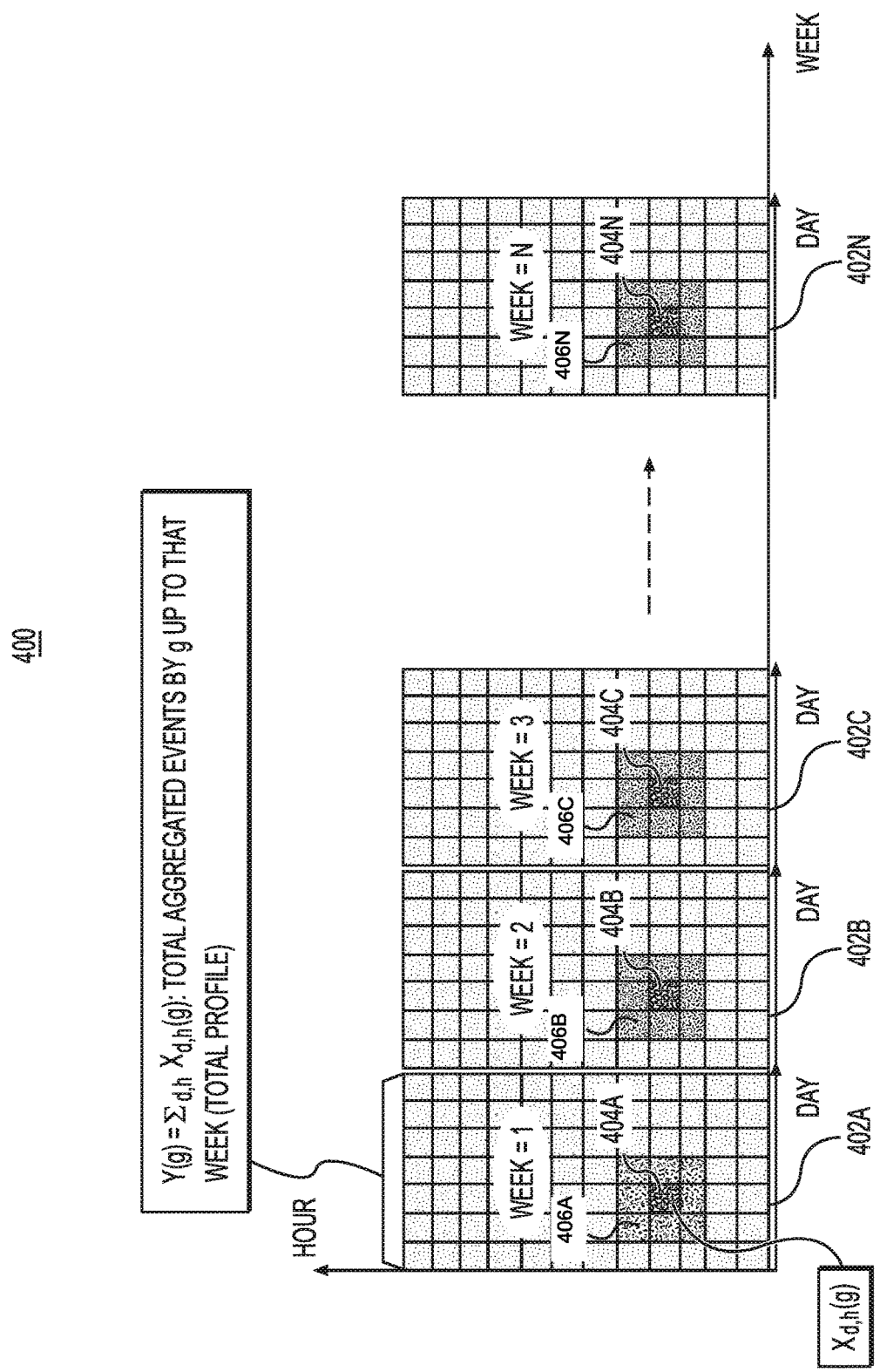
FIG. 4 illustrates an example diagram of time specific user profile data and total time-aggregated user profile data.

Turning now to FIG. 4, which depicts an example diagram 400 of a time specific user profile $X_{d,h}(g)_{week}$ and a total time-aggregated user profile Y(g) that may be received, for example, by the analytics system 102. As illustrated, the time specific user profile $X_{d,h}(g)_{week}$ may correspond to a particular timeslot 404A, 404B, 404C, . . . 404N. For example, in one embodiment, the time specific user profile $X_{d,h}(g)_{week}$ may be expressed as:

$$X_{d,h}(g)_{week} = X_{d,h}(g)_{week-1} + S_{d,h}(g)_{week-1} \quad \text{Equation (1).}$$

As set forth by Equation (1), $X_{d,h}$, $(g)_{week-1}$ may include the aggregated time specific user profile up to the previous week (e.g., "week−1") and $S_{d,h}(g)_{week}$ may include the set of ACR user observed viewing data for the present week. Similarly, the total time-aggregated user profile Y(g) 402A, 402B, 402C, . . . 402N may correspond to the total (e.g., all time) aggregated profile Y(g) for category group g, and may be represented as the summation of all timeslots up to a particular instance in time. For example, in one embodiment, the total time-aggregated user profile Y(g) may be expressed as:

$$Y(g) = \Sigma_{d,h} X_{h,d}(g) \quad \text{Equation (2).}$$

In certain embodiments, as further illustrated in FIG. 4, in addition to receiving the time specific user profile $X_{d,h}(g)_{week}$ corresponding to the particular timeslot 404A, 40B, 404C, . . . 404N, the analytics system 102 may also receive time specific user profiles from neighboring timeslots 406A, 406B, 406C, . . . 406N. For instance, in some embodiments, a convolutional and/or pooling profile $X_{week}^c(d,h,g)$ (e.g., corresponding to the neighboring timeslots 406A, 406B, 406C, . . . 406N) may correspond to, for example, a summation of the time specific user profiles of the neighboring timeslots 406A, 406B, 406C, . . . 406N. For example, in one embodiment, the convolutional user profile $X_{week}^c(d,h,g)$ (e.g., corresponding to the neighboring timeslots 406A, 406B, 406C, . . . 406N) may be expressed as:

$$X_{d,h}^c(g) = \Sigma_{k=h, h \pm 1} X_{d,h}(g) \quad \text{Equation (3).}$$

FIG. 5 illustrates a workflow diagram 500 for deriving an optimal regression coefficient $Z_{d,h}$ for a particular user and at a particular timeslot, in accordance with the presently disclosed embodiments. In certain embodiments, the workflow diagram 500 may begin, for example, with the analytics system 102 measuring (functional block 502) a loss function $\sigma^2$ (e.g., deviation) between the observation of desirable media content $S_{d,h}(g)$ and the prediction of desirable media content $w_{d,h}(g)$. For example, in one embodiment, the prediction of desirable media content $w_{d,h}(g)$ may be derived as a linear expression (functional block 504), which may be expressed as:

$$w_{d,h}(g) Z_{d,h} x_{d,h}(g) + (1 - Z_{d,h}) y(g) \quad \text{Equation (4).}$$

In certain embodiments, based on the measuring of the loss function $\sigma^2$ (e.g., deviation), the analytics system 102 may minimize (functional block 506) the loss function $\sigma^2$ between the observation of desirable media content $S_{d,h}(g)$ and the prediction of desirable media content $w_{d,h}(g)$. For example, in one embodiment, the regression coefficient $Z_{d,h}$, may be determined by minimizing the total loss function $\sigma^2$ from all previous weeks. In one embodiment, the loss function $\sigma^2$ for each week may be expressed as:

$$\sigma^2 = \sum_{week=1, \ldots n} \sigma^2_{week} = \sigma^2_{week\_1} + \sigma^2_{week\_2} + \ldots \sigma^2_{week\_n} \quad \text{Equation 5}$$

-continued $$\sigma_{week}^2 = \sum_g (|S_{d,h,week}| w_{d,h}(g)_{week} - S_{d,h}(g)_{week})^2 =$$

$$\sum_g |S_{d,h,week}|^2 (w_{d,h}(g)_{week} - S_{d,h}(g)_{week})^2.$$

Thus, from Equation (5), in certain embodiments, the minimized loss function $\sigma^2$ may be calculated (functional block 508) based on a rate of change (e.g., mathematical derivative) of the total loss function $\sigma^2$ shifted by the total time-aggregated user profile $Y_{week}(g)$ for the present week. For example, in one embodiment, the minimized loss function $\sigma^2$ may be expressed as:

$$\frac{\delta \sigma^2}{\delta Z_{d,h}} = 0 = \sum_{week} \sum_g |S_{d,h,week}|^2 \qquad \text{Equation (6)}$$

$$(w_{d,h}(g)_{week} - S_{d,h}(g)_{week})(X_{d,h,week}(g) - Y_{week}(g)).$$

In certain embodiments, as further depicted by the workflow diagram 500, the analytics system 102 may proceed in calculating (functional block 510) a correlation of the time specific user profile $X_{d,h}(g)$ and/or the weekly normalized time specific user profile set $\{X_{d,h}(g)\}$ and the observation of desirable media content $S_{d,h}(g)$ and/or the weekly observed desirable media content set $\{S_{d,h}(g)\}$ based on the updated $APC_{d,h}$, and the updated $APV_{d,h}$. Specifically, the correlation along with the updated $APC_{d,h}$, and the updated $APV_{d,h}$ may be utilized by the analytics system 102 to derive (functional block 512) an optimal regression coefficient $Z_{d,h}$, for a particular user and at the particular timeslot. For example, in one embodiment, the correlation of the time specific user profile $X_{d,h}(g)$ and the observation of desirable media content $S_{d,h}(g)$ may be expressed as:

$$Z_{d,h} = \text{correlation}(\{X_{d,h}\}, \{S_{d,h}\}) = \frac{APC_{d,h}}{APV_{d,h}}. \qquad \text{Equation (7)}$$

As set forth by Equation (7), the correlation may represent a measurement of how particularly well, for example, the time specific user profile $X_{d,h}(g)$ and/or the weekly normalized time specific user profile $\{X_{d,h}(g)\}$ varies in correlation with the observation of desirable media content $S_{d,h}(g)$ and/or the weekly observed desirable media content set $\{S_{d,h}(g)\}$. In certain embodiments, based on Equation (7) and the Equation (4) discussed previously (e.g., $w_{d,h}(g) = Z_{d,h}X_{d,h}(g) + (1 - Z_{d,h})y(g)$), the regression coefficient $Z_{d,h}$, may be iteratively optimized and retrained (functional block 514) over time to provide an increasingly accurate prediction of desirable media content $w_{d,h}(g)$ for a particular user and at a particular timeslot, in accordance with the present embodiments. As explained herein, an updated regression coefficient $Z_{d,h}$, to account for new user behavior may determined without having to re-calculate the regression coefficient $Z_{d,h}$, based on the previous user history. Specifically, the analytics system 102 may iteratively and optimally weigh or balance the regression coefficient $Z_{d,h}$, such that the regression coefficient $Z_{d,h}$, may be fine-grained to a specific user and to a specific timeslot (e.g., day-hour timeslot).

FIG. 6 illustrates a workflow diagram 600 for calculating and storing an updated $APC_{d,h,w}$ and an updated $APV_{d,h,w}$, in response to receiving an observation of desirable media content $S_{d,h}(g)$, in accordance with the presently disclosed embodiments. For example, in some embodiments, the workflow diagram 600 may be iteratively (e.g., recursively) performed by the analytics system 102 to optimize and retrain the regression coefficient $Z_{d,h}$, and, by extension, the prediction of desirable media content $w_{d,h}(g)$ (e.g., as expressed by Equation (4) above). In such a manner, the analytics system 102 may generate an increasingly accurate prediction of desirable media content $w_{d,h}(g)$ with each subsequent iteration (e.g., for the present week and the forthcoming week(s)). Specifically, the analytics system 102 may iteratively and optimally weigh or balance the regression coefficient $Z_{d,h}$, such that the regression coefficient $Z_{d,h}$, may be fine-grained to a specific user and to a specific timeslot (e.g., day-hour timeslot). Thus, the present embodiments may provide a prediction of the particular user's likely viewing behavior by iteratively and optimally balancing, for example, the particular user's specific time-based viewing history and at least some of the particular user's nontemporal-based viewing history.

In certain embodiments, the analytics system 102 may receive ACR observed user viewing inputs (functional block 602), which may, in some embodiments, include all of the observed desirable media content (e.g., $\{S_{d,h}(g)\}_1$, $\{S_{d,h}(g)\}_2$, $\{S_{d,h}(g)\}_3$, ... $\{S_{d,h}(g)\}_{last\_week}$) for a particular timeslot of each of the previous most recent week(s). In some embodiments, the analytics system 102 may then update (functional block 604) the time specific user profile $X_{d,h}(g)$ and the total time-aggregated user profile $Y(g)$ based on, for example, the received observation of desirable media content $S_{d,h}(g)$. The analytics system 102, for example, may then perform a convolution (functional block 606) of the time specific user profile $X_{d,h}(g)$. For example, as discussed above, the convolutional user profile $X_{week}^c$, (d,h,g) may correspond to the neighboring timeslots of the particular timeslot to which the time specific user profile $X_{d,h}(g)$ corresponds.

As further depicted by the workflow diagram 600, in some embodiments, the analytics system 102 may then normalize (functional block 608) the convolutional user profile $X_{week}^c$ (d,h,g) and the total time-aggregated user profile $Y(g)$. The analytics system 102 may then calculate a covariance (e.g., "Cov( )") and a variance (e.g., "Var( )") (functional block 610) of the normalization of the convolutional user profile $X_{week}^c$ (d,h,g) and the total time-aggregated user profile $Y(g)$. Specifically, the covariance (e.g., "Cov( )") may correspond to, for example, a covariance of the time specific user profile $X_{d,h}(g)$ and the received observation of desirable media content $S_{d,h}(g)$, subsequent to being shifting by the total time-aggregated user profile $Y(g)$ (e.g., bias function). For example, in one embodiment, the covariance (e.g., "Cov( )") may be expressed as:

$$\text{Cov}(X_{d,h}, S_{d,h}) = |S_{d,h}|^2 (x_{d,h} - y) \cdot (s_{d,h} - y) \qquad \text{Equation (8)}.$$

It should be further appreciated that while the covariance (e.g., "Cov( )") as expressed by Equation (8) may, in some instances, include a negative result, the workflow diagram 600 may also include a rectified linear unit (ReLU) (functional block 612), which may be applied by the analytics system 102 to prevent the covariance (e.g., "Cov( )") from producing a negative covariance result. Similar to that discussed with respect to the covariance (e.g., "Cov( )"), the variance (e.g., "Var( )") may correspond to, for example, a variance of the time specific user profile $X_{d,h}(g)$, subsequent to being shifting by the total time-aggregated user profile $Y(g)$ (e.g., bias function). For example, in one embodiment, the variance (e.g., "Var( )") may be expressed as:

$$\text{Var}(X_{d,h}) = |S_{d,h}|^2 |Y - X_{d,h}|^2 \qquad \text{Equation (9)}.$$

In some embodiments, as further depicted by the workflow diagram 600, the analytics system 102 may also calculate (functional block 614) an updated $APC_{d,h,w}$ and an updated $APV_{d,h,w}$. For example, in one embodiment, the updated $APC_{d,h,w}$ may be expressed as:

$$APC_{d,h,w} = \sum_{w,g} |S_{d,h,w}|^2 (X_{d,h,w} - Y_w) \cdot (S_{d,h,w} - Y_w) = \quad \text{Equation (10)}$$

$$APC_{d,h,w-1} + \text{Cov}(X_{d,h,w-1}, S_{d,h,w-1}).$$

Similarly, in one embodiment, the updated $APV_{d,h,w}$ may be expressed as:

$$APV_{d,h,w} = \Sigma_{w,g}|S_{d,h,w}|^2 |Y_w - X_{d,h,w}|^2 = APV_{d,h,w-1} + \text{Var}(X_{d,h,w-1}) \quad \text{Equation (11)}.$$

In certain embodiments, the updated $APC_{d,h,w}$ and the updated $APV_{d,h,w}$ may be then stored (functional block 616) together with the time specific user profile $X_{d,h}(g)_{week}$. In a such a manner, any subsequent $APC_{d,h,w+1}$ and subsequent $APV_{d,h,w+1}$ for the forthcoming week(s), for example, may be ascertained by merely summing the covariance (e.g., "Cov( )") of the time specific user profile $X_{d,h}(g)_{week-1}$ for the previous week and the observation of desirable media content $S_{d,h}(g)_{week-1}$ for the previous week (e.g., as expressed by Equation (10) above) and the variance (e.g., "Var( )") of the time specific user profile $X_{d,h}(g)_{week-1}$ for the previous week (e.g., as expressed by Equation (11) above) without rederiving the regression coefficient $Z_{d,h}$.

FIG. 7 illustrates a workflow diagram 700 for generating a prediction of desirable media content $w_{d,h}(g)$, in accordance with the presently disclosed embodiments. For example, in certain embodiments, the analytics system 102 may receive (functional block 702) a time specific user profile $X_{d,h}(g)_{week}$ and the total time-aggregated user profile $Y(g)$ in a day-hour context and for a particular programming category group g. As further illustrated by the workflow diagram 700, the analytics system 102 may calculate (functional block 704) an APC and APV based on the time specific user profile $X_{d,h}(g)_{week}$, and may then derive (functional block 704) a regression coefficient $Z_{d,h}$, based on the APC and the APV. For example, in one embodiment, the regression coefficient $Z_{d,h}$ may be expressed as:

$$Z_{d,h} = \frac{\sum_{week}\sum_g |S_{d,h,week}|^2 (X_{d,h,week}(g) - Y_{week}(g))}{\sum_{week}\sum_g |S_{d,h,week}|^2 (X_{d,h,week}(g) - Y_{week}(g))^2} = \frac{APC}{APV}. \quad \text{Equation (12)}$$

The analytics system 102, for example, may then perform a convolution (functional block 706) of the time specific user profile $X_{d,h}(g)$. For example, as previously noted above, the convolutional user profile $X_{week}^c$ (d h, g) may correspond to the neighboring timeslots of the particular timeslot to which the time specific user profile $X_{d,h}(g)$ corresponds. As further depicted by the workflow diagram 700, in some embodiments, the analytics system 102 may then normalize (functional block 708) the convolutional user profile $X_{week}^c$ (d, h, g) and the total time-aggregated user profile $Y(g)$. The analytics system 102 may then generate (functional block 710) a prediction of desirable media content $w_{d,h}(g)$ (e.g., as expressed by Equation (4) above) based on the updated $APC_{d,h,w}$, the updated $APV_{d,h,w}$, and the regression coefficient $Z_{d,h}$. In other embodiments, the analytics system 102 may generate (functional block 710) a prediction of desirable media content $w_{d,h}(g)$ based on the regression coefficient $Z_{d,h}$, the convolutional user profile $X_{week}^c$(d,h,g) and the total time-aggregated user profile $Y(g)$ (e.g., relying at least in part on Equation (12) and/or Equation (6) as expressed above).

Specifically, the prediction of desirable media content $w_{d,h}(g)$ may be generated to predict the probability that a particular user is likely to view a specific media content (e.g., TV program) within the particular category group g, on or about the particular day d, and at or about the particular hour h of the present week or the forthcoming week(s). The prediction of desirable media content $w_{d,h}(g)$ may be then iteratively optimized and retrained, such that an increasingly accurate prediction of desirable media content $w_{d,h}(g)$ may be generated with each subsequent iteration (e.g., for the present week and the forthcoming week(s)). Specifically, as previously noted, the analytics system 102 may iteratively and optimally weigh or balance the regression coefficient $Z_{d,h}$, such that the regression coefficient $Z_{d,h}$ may be fine-grained to a specific user and to a specific timeslot (e.g., day-hour timeslot).

Thus, the present embodiments may provide a prediction of the particular user's likely viewing behavior by iteratively and optimally balancing, for example, the particular user's specific time-based viewing history and at least some of the particular user's nontemporal-based viewing history. This significantly decreases the amount of computational resources needed to provide personalized recommendations, both due to processing time and power in calculating the regression coefficient $Z_{d,h}$ and in storage resources needed to maintain voluminous historical data. In addition, the ability of the recommendation system disclosed herein to iteratively update the regression coefficient $Z_{d,h}$ in a manner that reflects user behavior without having to store past user data long-term further increases user privacy and security.

Figure 8:
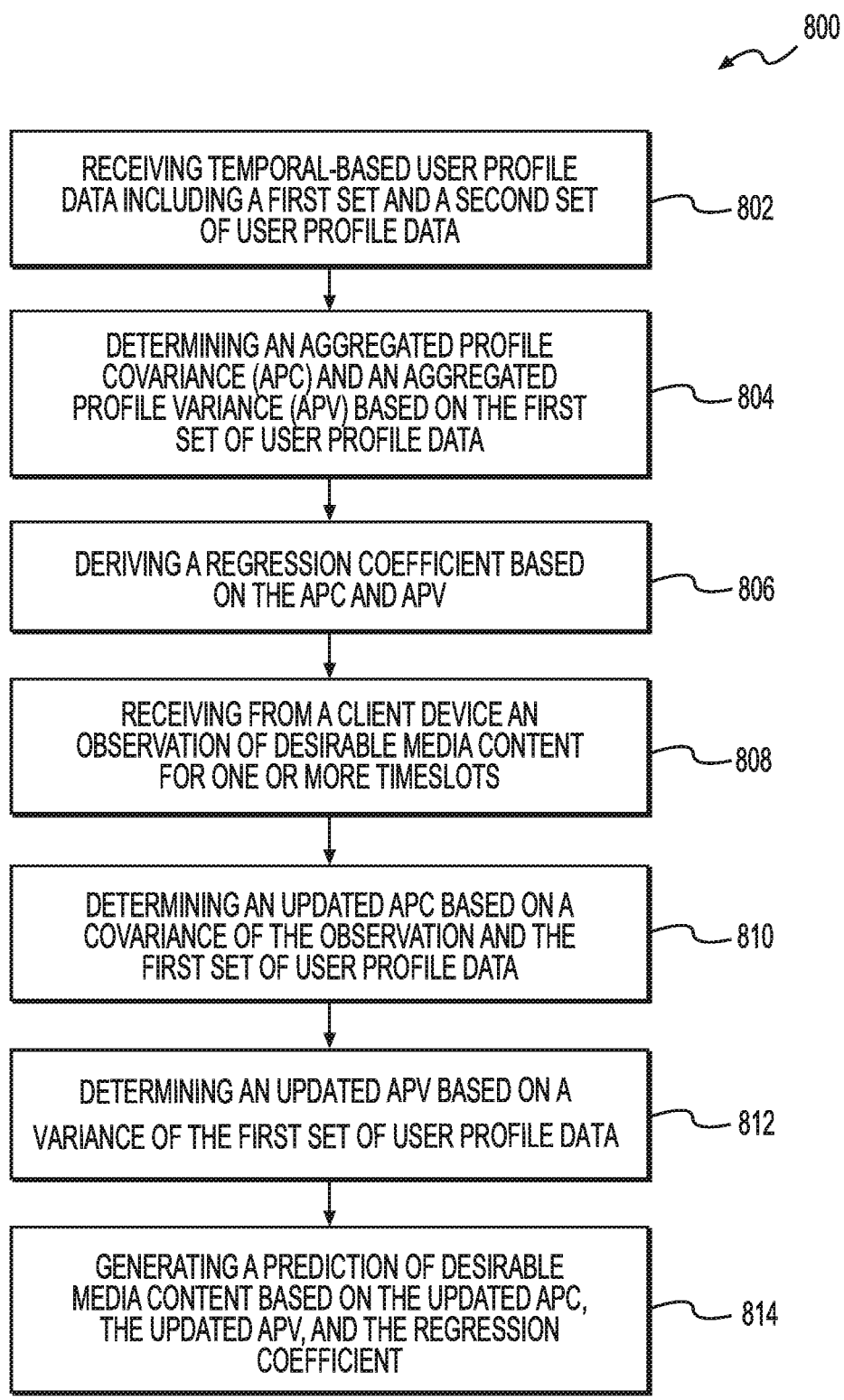
FIG. 8 illustrates an example flow diagram of a method for generating a prediction of desirable media content.

FIG. 8 illustrates is a flow diagram of a method 800 for generating a prediction of desirable media content (e.g., recommendations for user viewing of live or near-live media content) based on personalized user contexts and personalized user viewing preferences for a particular user at a particular timeslot, in accordance with the presently disclosed embodiments. The method 800 may be performed utilizing one or more processing devices (e.g., analytics system 102) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or some combination thereof.

The method 800 may begin block 802 with the one or more processing devices (e.g., analytics system 102) receiving temporal-based user profile data including a first set of user profile data and a second set of user profile data. For example, in some embodiments, the temporal-based user profile data may include a time specific user profile (e.g., $X_{d,h}(g)_{week}$) and the total time-aggregated (e.g., all-time) user profile (e.g., $Y(g)$) in a day-hour context and for a particular programming category group g. The method 800 may continue at block 804 with the one or more processing devices (e.g., analytics system 102) determining an aggregated profile covariance (APC) and an aggregated profile variance (APV) based on the first set of user profile data. The method 800 may then continue at block 806 with the one or more processing devices (e.g., analytics system 102) deriving a regression coefficient based on the APC and the APV. For example, in certain embodiments, the analytics system 102 may derive a regression coefficient $Z_{d,h}$ (e.g., weight factor) based on the APC and the APV.

The method 800 may then continue at block 808 with the one or more processing devices (e.g., analytics system 102) receiving from a client device an observation of desirable media content for one or more particular timeslots. The method 800 may then continue at block 810 with the one or more processing devices (e.g., analytics system 102) determining an updated APC based on a covariance of the observation of desirable media content and the first set of user profile data. The method 800 may then continue at block 812 with the one or more processing devices (e.g., analytics system 102) determining an updated APV based on variance of the first set of user profile data. For example, in certain embodiments, the analytics system 102 may determine the updated $APC_{d,h,w}$ based on a covariance of the time specific user profile $X_{d,h}(g)_{week}$ and the observation of desirable media content $S_{d,h}(g)_{week}$ for the one or more particular timeslots. Similarly, the analytics system 102 may determine the updated $APV_{d,h,w}$ based on a variance of the time specific user profile $X_{d,h}(g)_{week}$.

The method 800 may then conclude at block 814 with the one or more processing devices (e.g., analytics system 102) generating a prediction of desirable media content based on the updated APC, the updated APV, and the regression coefficient. For example, as previous discussed above, the analytics system 102 may generate a prediction of desirable media content $w_{d,h}(g)$ (e.g., as expressed by Equation (4) above) based on the updated $APC_{d,h,w}$, the updated $APV_{d,h,w}$, and the regression coefficient $Z_{d,h}$. Specifically, as previously noted, the prediction of desirable media content $w_{d,h}(g)$ may be generated to predict the probability that a particular user is likely to view a specific media content (e.g., TV program) within the particular category group g, on or about the particular day d, and at or about the particular hour h of the present week or the forthcoming week(s). The prediction of desirable media content $w_{d,h}(g)$ may be then iteratively optimized and retrained, such that an increasingly accurate prediction of desirable media content $w_{d,h}(g)$ may be generated with each subsequent iteration (e.g., for the present week and the forthcoming week(s)).

For example, as previously noted, the analytics system 102 may iteratively and optimally weigh or balance the regression coefficient $Z_{d,h}$, such that the regression coefficient $Z_{d,h}$ may be fine-grained to a specific user and to a specific timeslot (e.g., day-hour timeslot). Thus, the present embodiments may provide a prediction of the particular user's likely viewing behavior by iteratively and optimally balancing, for example, the particular user's specific time-based viewing history and at least some of the particular user's nontemporal-based viewing history. This significantly decreases the amount of computational resources needed to provide personalized recommendations, both due to processing time and power in calculating the regression coefficient $Z_{d,h}$ and in storage resources needed to maintain voluminous historical data. In addition, the ability of the recommendation system disclosed herein to iteratively update the regression coefficient $Z_{d,h}$ in a manner that reflects user behavior without having to store past user data long-term increases user privacy and security.

Figure 9:
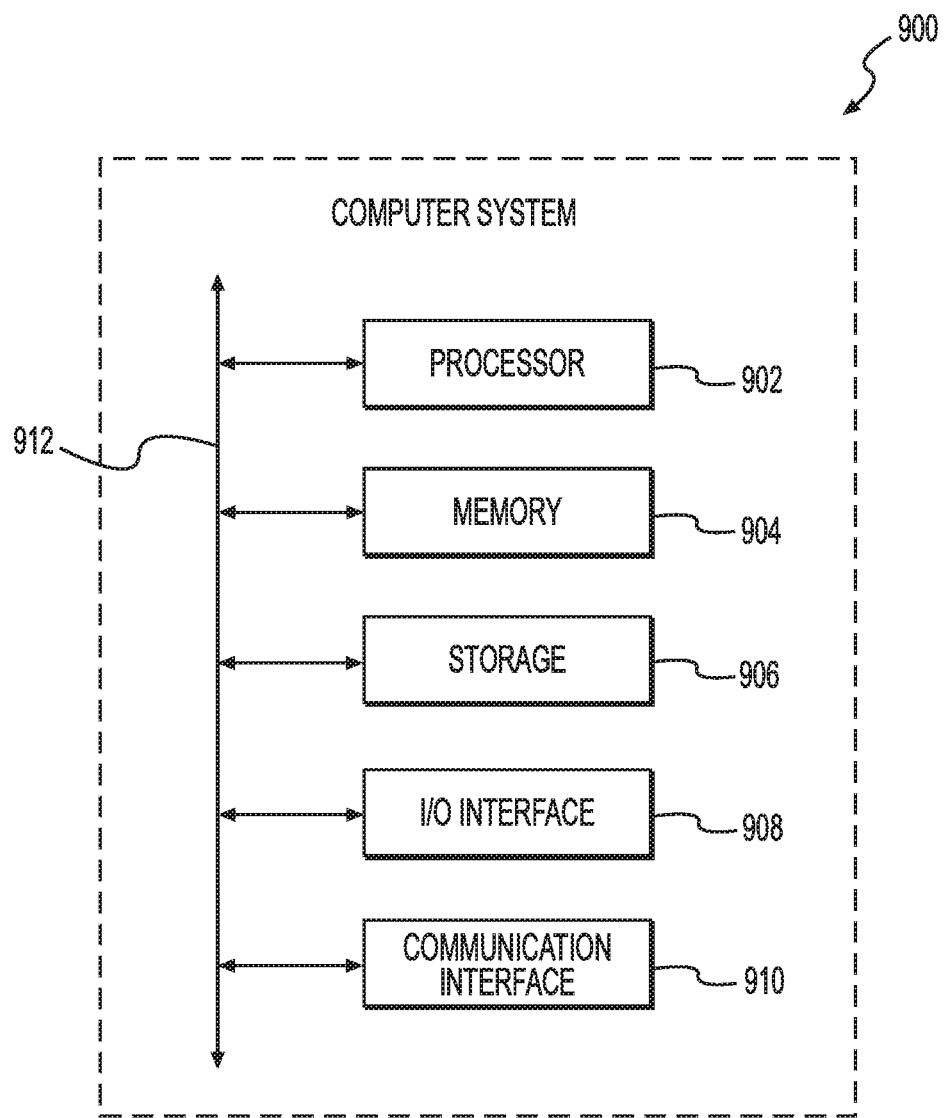
FIG. 9 illustrates an example computer system.

FIG. 9 illustrates an example computer system 900 that may be useful in performing one or more of the foregoing techniques as presently disclosed herein. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks.

Where appropriate, one or more computer systems 900 may perform without substantial spatial or temporal limitation one or more steps of one or more methods described or illustrated herein. As an example, and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example, and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902.

Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example, and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere).

One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example, and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 906 for them. Where appropriate, I/O interface 908 may include one or more device or software drivers enabling processor 902 to drive one or more of these I/O devices. I/O interface 908 may include one or more I/O interfaces 906, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it.

As an example, and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example, and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method implemented by a computing system, the method comprising:
    receiving temporal-based user profile data associated with a client device configured to display media content on a display of the client device, wherein the temporal-based user profile data comprises a first set of user profile data and a second set of user profile data, and wherein the client device is distinct from the computing system;
    determining an aggregated profile covariance (APC) and an aggregated profile variance (APV) based at least in part on the first set of user profile data;
    deriving a regression coefficient based at least in part on the APC and the APV;
    in response to receiving from the client device an observation of desirable media content for one or more particular timeslots of a plurality of timeslots:
        determining an updated APC based at least in part on a covariance of the first set of user profile data and the observation of desirable media content for the one or more particular timeslots;
        determining an updated APV based at least in part on a variance of the first set of user profile data; and
        generating a prediction of desirable media content based at least in part on the updated APC, the updated APV, and the regression coefficient, wherein the prediction of desirable media content corresponds to the one or more particular timeslots;
    providing the prediction of desirable media content to the client device for display; and
    based on the prediction, causing the client device to display on the display the desirable media content at the one or more particular timeslots.

2. The method of claim 1, wherein causing the client device to display on the display the desirable media content comprises causing the client device to display on the display the desirable media content at one or more particular day-hour timeslots.

3. The method of claim 1, further comprising:
in response to receiving from the client device the observation of desirable media content for the one or more particular timeslots:
storing the updated APC and the updated APV together with the first set of user profile data; and
generating a second prediction of desirable media content without rederiving the regression coefficient.

4. The method of claim 1, wherein the plurality of timeslots comprises a total of 168 day-hour timeslots per weekly time period.

5. The method of claim 1, wherein the first set of user profile data comprises time-specific user profile data.

6. The method of claim 1, wherein the second set of user profile data comprises time-aggregated user profile data.

7. The method of claim 1, wherein deriving the regression coefficient comprises minimizing a total loss function, and wherein the total loss function comprises a summation of a deviation between the prediction of desirable media content and the observation of desirable media content.

8. The method of claim 1, wherein generating the prediction of desirable media content comprises iteratively weighing the temporal-based user profile data and at least some of a nontemporal-based user viewing history.

9. The method of claim 1, further comprising deriving a convolution of the first set of user profile data prior to generating the prediction of desirable media content.

10. The method of claim 9, further comprising normalizing the convolution of the first set of user profile data and the second set of user profile data prior to generating the prediction of desirable media content.

11. A non-transitory computer-readable medium comprising instructions that, when executed by one or more processors of a computing system, cause the one or more processors to:
receive temporal-based user profile data associated with a client device configured to display media content on a display of the client device, wherein the temporal-based user profile data comprises a first set of user profile data and a second set of user profile data, and wherein the client device is distinct from the computing system;
determine an aggregated profile covariance (APC) and an aggregated profile variance (APV) based at least in part on the first set of user profile data;
derive a regression coefficient based at least in part on the APC and the APV;
in response to receiving from the client device an observation of desirable media content for one or more particular timeslots of a plurality of timeslots:
determine an updated APC based at least in part on a covariance of the first set of user profile data and the observation of desirable media content for the one or more particular timeslots;
determine an updated APV based at least in part on a variance of the first set of user profile data; and
generate a prediction of desirable media content based at least in part on the updated APC, the updated APV, and the regression coefficient, wherein the prediction of desirable media content corresponds to the one or more particular timeslots;
provide the prediction of desirable media content to the client device for display; and
based on the prediction, cause the client device to display on the display the desirable media content at the one or more particular timeslots.

12. The non-transitory computer-readable medium of claim 11, wherein the instructions to cause the client device to display on the display the desirable media content further comprise instructions to cause the client device to display on the display the desirable media content at one or more particular day-hour timeslots.

13. The non-transitory computer-readable medium of claim 11, further comprising instructions to cause the one or more processors to:
in response to receiving from the client device the observation of desirable media content for the one or more particular timeslots:
store the updated APC and the updated APV together with the first set of user profile data; and
generate a second recommendation of desirable media content without rederiving the regression coefficient.

14. The non-transitory computer-readable medium of claim 11, wherein the plurality of timeslots comprises a total of 168 day-hour timeslots per weekly time period.

15. The non-transitory computer-readable medium of claim 11, wherein the first set of user profile data comprises time-specific user profile data.

16. The non-transitory computer-readable medium of claim 11, wherein the second set of user profile data comprises time-aggregated user profile data.

17. The non-transitory computer-readable medium of claim 11, further comprising instructions to cause the one or more processors to minimize a total loss function, wherein the total loss function comprises a deviation between the prediction of desirable media content and the observation of desirable media content.

18. The non-transitory computer-readable medium of claim 11, further comprising instructions to cause the one or more processors to derive a convolution of the first set of user profile data prior to generating the prediction of desirable media content.

19. The non-transitory computer-readable medium of claim 18, further comprising instructions to cause the one or more processors to normalize the convolution of the first set of user profile data and the second set of user profile data prior to generating the prediction of desirable media content.

20. A computing system, comprising:
one or more non-transitory computer-readable storage media including instructions; and
one or more processors coupled to the storage media, the one or more processors configured to execute the instructions to:
receive temporal-based user profile data associated with a client device configured to display media content on a display of the client device, wherein the temporal-based user profile data comprises a first set of user profile data and a second set of user profile data, and wherein the client device is distinct from the computing system;
determine an aggregated profile covariance (APC) and an aggregated profile variance (APV) based at least in part on the first set of user profile data;
derive a regression coefficient based at least in part on the APC and the APV;
in response to receiving from the client device an observation of desirable media content for one or more particular timeslots of a plurality of timeslots:

determine an updated APC based at least in part on a covariance of the first set of user profile data and the observation of desirable media content for the one or more particular timeslots;
determine an updated APV based at least in part on a variance of the first set of user profile data; and
generate a prediction of desirable media content based at least in part on the updated APC, the updated APV, and the regression coefficient, wherein the prediction of desirable media content corresponds to the one or more particular timeslots;

provide the prediction of desirable media content to the client device for display; and based on the prediction, cause the client device to display on the display the desirable media content at the one or more particular timeslots.

\* \* \* \* \*